May 24, 1927.
J. A. MILLER
1,629,520
PLEASURE RAILWAY STRUCTURE
Filed Nov. 27, 1925
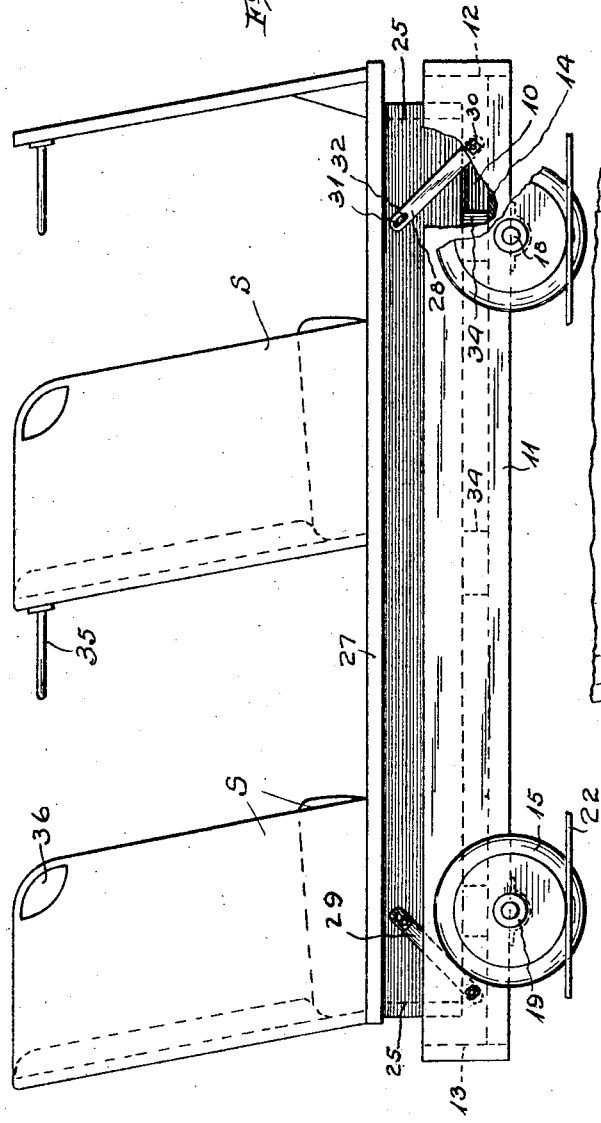
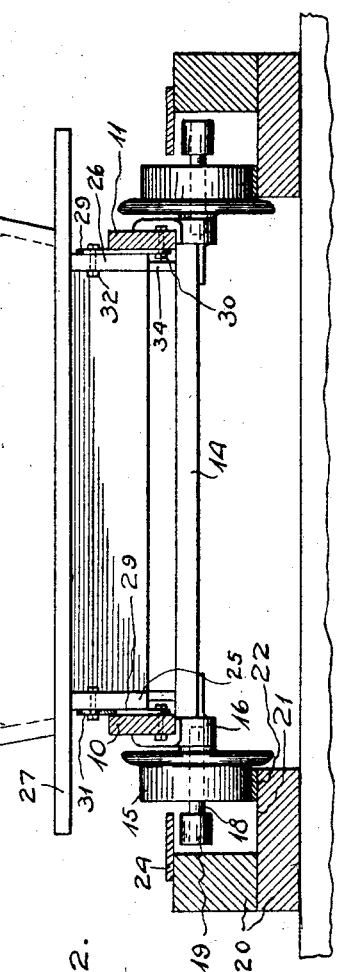
Inventor,
John A. Miller
By Brown, Boettcher & Dienner
Attys.

Patented May 24, 1927.

1,629,520

UNITED STATES PATENT OFFICE.

JOHN A. MILLER, OF HOMEWOOD, ILLINOIS.

PLEASURE-RAILWAY STRUCTURE.

Application filed November 27, 1925. Serial No. 71,580.

My invention relates to pleasure railway structures and particularly to improved car construction and operation therefor.

My invention is particularly adaptable on pleasure railway structures where the cars have their vertical displacement relative to the rails limited by means of safety abutments, such locking being necessary where there are sudden and steep summits and dips over which the car travels. When a car rounds a summit at rapid speed, or is about to take a sudden dip, the car, unless restrained by the safety mechanism, would vertically leave the rail, owing to the action of centrifugal force. The important object of the invention is to utilize such centrifugal action to make the ride more sensational to the passengers. To accomplish this I so mount the car body or passenger seat structure on the truck part of the car that such body may move vertically or longitudinally or with a combination of such movements, through a limited degree relative to the truck, which truck is held to the rail structure by the safety abutment mechanism. As the car rapidly travels along the track over summits and dips the car body will be free to respond to inertia, centrifugal force and gravity to move relative to the truck part and to give the passengers the sensation of moving away from the tracks.

The various features of my invention are incorporated in the structure disclosed on the drawing in which Figure 1 is a side elevational view of a car;

Figure 2 is a rear elevational view of the car and showing also the track structure in section.

The truck part of the car shown comprises the side walls 10 and 11, the front and rear end walls 12 and 13 and the floor 14. The wheel structures W are secured to the truck part. Each wheel structure shown comprises a flanged wheel 15 journaled on an axle 18 extending from a frame 16 secured to the truck part. Each axle at its outer end journals a safety roller 19.

The track rail structure shown comprises a plurality of laminations 20 forming the lower step 21 on which are secured the track rails 22 with which the flanged wheels 15 engage. Mounted on top of the rail structure and overhanging the step 21 is the guard rail 24 with the underside of which the safety rollers 19 engage in order to limit the vertical displacement of the car relative to the tracks. The flanges on the wheels 15 limit the lateral play of the cars on the rail.

The body or seat structure part of the car comprises the side walls 25 and 26 between which extend the seat structures S. From the side walls extend the running boards 27 which overhang the vehicle wheels and also form a pathway from the loading and unloading platforms of the railway structure to the seat structures of the car. The body structure has limited longitudinal and vertical movement relative to the truck part. One way of accomplishing this is shown on the drawing. The side walls 25 and 26 extend inside of the side walls 10 and 11 of the truck part with the front and rear links 28 and 29 interposed, the links being pivoted at their lower ends to the sides 10 and 11 by means of bolts 30 and at their upper ends having the longitudinal slots 31 receiving the bolts 32 extending through the side walls 25 and 26 of the body structure. The body structure normally rests on preferably yielding supports 34 on the floor 14 of the truck part, which supports may be springs or rubber blocks. The front links 28 extend diagonally rearwardly and the rear links 29 extend diagonally forwardly as clearly shown on Figure 1, the bolts 32 being normally at the bottoms of the slots 31.

With the arrangement disclosed, when the car is traveling along the track the truck part will be allowed only a limited vertical displacement relative to the rail, said displacement being eventually checked by the engagement of the safety rollers 19 with the guard rails 24. The body part or seat structure may, however, respond to inertia or centrifugal force and move longitudinally or vertically or with combined longitudinal and vertical movement, relative to the truck part, such relative movement being limited by the links. Such relative movement becomes particularly sensational as the car takes a summit. Just before the car is to take the down grade inertia and centrifugal force will tend to cause it to continue in the up grade direction, but as the truck part is held to the rails by the safety rollers only the body part with the seat structures thereon will respond and will be raised away from the truck part a distance. The sensation is further increased by having the floor or foot support 14 part of the truck part so that when the body part rises away from the truck part, the feet of the passengers will leave the floor. The body part will, of course, eventually come back to normal position against the cushioning supports 33.

Depending upon the track conditions and the relative momentums of the truck and body part, the body part may move in various ways relative to the truck part. It may move parallelly away from the truck part or its front or rear end may swing upwardly, or it may shift longitudinally, all these various movements relative to the truck part and the floor 14 providing considerable sensation for the passengers. At the same time there is complete safety as the seat structures move with the passengers and there is, therefore, no danger of passengers falling from or being thrown from the seat. Safety devices such as handle bars 35 and grips 36 are provided for the passengers for keeping them in the seats.

I do not desire to be limited to the exact structure, arrangement and operation shown and described, as modifications can be made which would still come within the scope of the invention which I claim as follows:—

1. A car for pleasure railway structures comprising a truck part having track wheels and a body part having passenger seats thereon, links connecting between said truck part and said body part, said links being slotted whereby to permit bodily separation of said body part from said truck part and to limit such separating movement.

2. A car for pleasure railway structures comprising a truck part having track wheels and a body part having passenger seats thereon, said body part normally seating on said truck part, links extending between and pivoted to said truck part and body part, said links being inclined toward each other and being slotted to permit bodily separation of said body part and said truck part and to limit such separating movement.

3. A car for pleasure railway structures comprising a truck part having track wheels and a body part having passenger seats thereon, links in the form of slotted bars engaging with the sides of said truck part and body part respectively, and means whereby said links will permit limited bodily movement of said body part relative to said truck part in response to centrifugal force.

In witness whereof, I hereunto subscribe my name this 20th day of November, 1925.

JOHN A. MILLER.